A. B. FOSTER.
PROCESS OF TREATING OILS.
APPLICATION FILED OCT. 15, 1917.
1,394,486.
Patented Oct. 18, 1921.
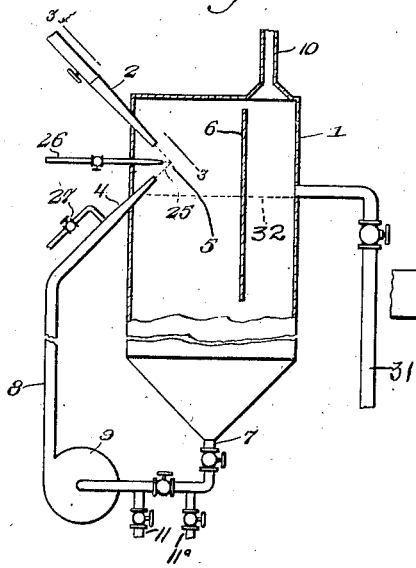
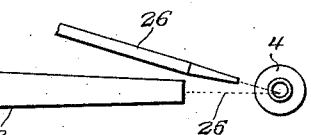
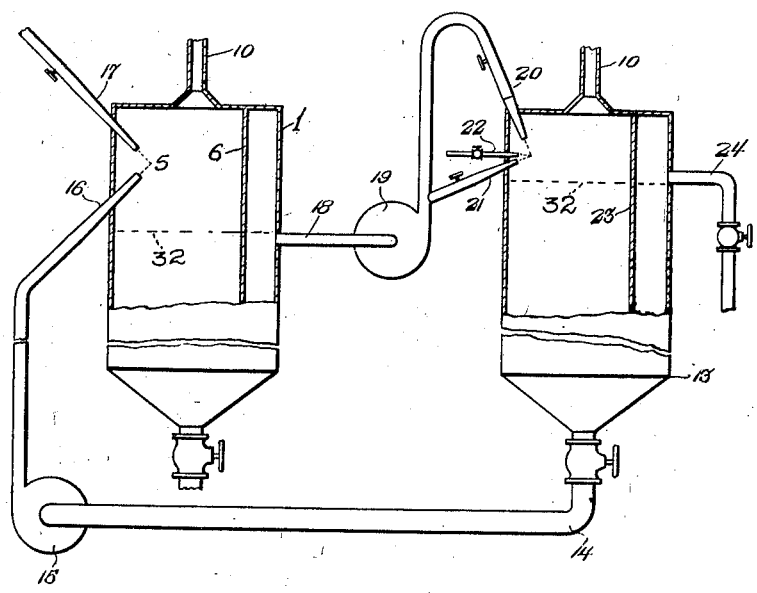
Inventor
A. B. Foster

UNITED STATES PATENT OFFICE.

ARTHUR B. FOSTER, OF WASHINGTON, DISTRICT OF COLUMBIA.

PROCESS OF TREATING OILS.

1,394,486.   Specification of Letters Patent.   Patented Oct. 18, 1921.

Application filed October 15, 1917. Serial No. 196,691.

*To all whom it may concern:*

Be it known that I, ARTHUR B. FOSTER, a citizen of the United States, residing at Washington, in the District of Columbia, have invented certain new and useful Improvements in Processes of Treating Oils, of which the following is a specification.

The present invention relates to an improved mode of chemically treating mineral oil products, such as kerosene, gasolene, lubricating oils, or crude oil or any of its distillates, and may also be applied to the treatment of somewhat similar materials such as coal tar, water-gas tar, producer-gas tar and the like.

It is usual practice in refining oils of the character mentioned to agitate the oil with a small quantity of sulfuric or other acid (or in some cases with a large quantity of sulfuric acid), then allow to settle, sometimes followed by a washing with cold water, and then a treatment with alkali solution such as caustic soda solution or sodium carbonate solution. Ammonia solution, and other alkalis have been proposed for this latter treatment.

The present invention comprises a particular mode of bringing the chemical agent, such as acid or alkali into intimate contact with the oil, since the two materials not being completely miscible with each other, the more complete the mixing of the oil and chemical, the more effective will be the treatment, or stated otherwise, a smaller quantity of acid more thoroughly mixed with the oil will produce the same result (or as good a result) as a larger quantity of the same acid less thoroughly mixed with the oil. When the mixing is more complete, there is less "acid loss," or decomposition of the oil.

Types of apparatus suitable for the carrying out of the mixing operation and the subsequent sedimentation are illustrated, more or less diagrammatically, in the accompanying drawing forming a part of this application. In said drawing, Figure 1 shows an elevation, partly in section, of an apparatus suitable for the mixing of oil and chemical, including the drawing up and reintroduction of the sludge produced by sedimentation of the mixture. Fig. 2 shows in elevation, partly in section, a more highly developed form of apparatus, in which the same operations are effected, in which the oil is first treated with the sludge formed by treating chemical and oil, and after sedimentation the oil is treated directly with chemical. Fig. 3 shows a detail of a preferred arrangement of pipes or nozzles for the mixing operation, the angular difference being exaggerated.

In accordance with the present invention, the mixing is preferably effected by squirting powerful streams of liquids at each other, the axes of the streams meeting each other at a large angle, preferably approximately 90°, although the invention is not limited to the exact angle at which the streams meet. The streams preferably meet each other while their axes are not in exactly the same plane, but while they are in closely adjacent but distinct planes. In this way there is produced a more complete mixing of the liquids. In the drawing, 1 shows a suitable tank or receptacle, preferably of considerable depth in which streams of oil from the nozzles 2 and 4 meet at about the point 5, thereby producing a sort of atomization, and the more or less atomized mixture is thereby projected with great force against the baffle 6. The mixed oil and chemical then fall into the body of material in the tank and are allowed to settle in the usual manner, for the separation of sludge. The material introduced through the nozzle 4 may constitute the mixture of sludge and oil drawn off at the bottom of the tank 1 through the pipe 7, and projected through pipe 8 by pump 9. Any gases and vapors generated in the treating receptacle may find exit through the pipe 10 to a suitable device for recovery of valuable products therefrom, or a device for destroying noxious gases, or both, or to a stack. If desired the material drawn off through pipe 7 may be conducted elsewhere through pipe 11ª, and oil introduced by pipe 11. 31 shows a draw-off pipe. The dotted line 32 indicates the normal liquid level in the tank.

In the treatment of mineral oil with acid, the acid sludge drawn off may contain a considerable amount of unused sulfuric acid, and in the form of apparatus illustrated in Fig. 2, this material is drawn off from the acidulating tank 13 through pipe 14, pump 15, nozzle 16, to be projected against a stream of oil from nozzle 17, whereby the said acid sludge and the oil are thoroughly mixed, thereby effecting a saving of acid. The oil after sedimentation is then drawn off through pipe 18, pump 19 and delivered to nozzles 20 and 21 for atomization as above described, during which operation they are mixed with sulfuric acid from pipe 22, and are thereby projected in the form of a mist or spray against baffle 23, the treated oil being drawn off from the second tank at 24.

Referring to Fig. 3, which is a section on the line 3—3 looking in the direction of the arrow shown in Fig. 1, it will be noted that the line 25 representing the axis of the nozzle 2 does not strike the stream from the nozzle 4 concentrically, but slightly off-center. This produces a very complete mixing and atomization or *quasi* atomization of the two streams, there being a considerable centrifugal force or torque exerted, in addition to the force of the impact. As illustrated in Figs. 1 and 3, a pipe 26 for leading in a stream of sulfuric acid or other chemical (which may be at any desired angle to the axis 25) is provided, corresponding to the pipe 22 shown in Fig. 2. The pipe 26 preferably approaches very much closer to the point of meeting of the two streams, than do the pipes 2 and 4, and it is accordingly unnecessary to project the acid with very considerable force, merely sufficient force being required to throw a stream from the end of the pipe 26 to the meeting point. The acid could be introduced in any other manner, for example through the branch pipe 27 shown in Fig. 1, but this is usually not advisable.

It will be readily understood from the drawing that suitable valves or gates are provided for the various pipe connections.

The invention as above stated comprises the projecting of streams with considerable force, to a meeting point at which a chemical treatment is effected. The speed of the stream issuing from the nozzles 2, 4, 16, 17, 20 and 21 is not merely sufficient to project the oil to the point of meeting of the streams, but the streams must meet each other with great force, the streams preferably coming out of the nozzles with a force comparable with the water issuing from the nozzle of a fire hose, since all of the force necessary for the mixing and atomizing operation is to be derived from the momentum of the two streams.

While I have referred to the nozzles as being directed toward each other at approximately right angles, I call attention to the fact that the invention is not restricted to the particular angles. It is always preferable to employ an angle of considerably more than 60°, in order to produce the desired amount of atomization and it may be stated that generally angles between 60° and 120° are efficient.

While I have referred in the above specification to the use of two nozzles, I call attention to the fact that a greater number of nozzles may be employed, which nozzles may be at right angles to each other or not. Under some conditions it may be advisable to operate with a much greater number of nozzles.

I call attention to the fact that in Fig. 1, the pipe 27 meets the pipe 4 at substantially a right angle. There can be no atomization produced by such meeting, however, since the stream of liquids in the pipe 4 is confined by the walls of the pipe 4. The same would be true if the pipes were of the same size, and the oil and acid were introduced at the same rate of speed. To distinguish between any operation in which the streams meet each other within the pipes, and the process herein described in which the streams meet each other while not confined within pipes, I employ, in the appended claims, the expression " free " streams.

It is further to be noted that if the streams were to meet while submerged, atomization could not be produced.

What I claim is:

1. In the chemical treatment of mineral oil products, the step of directing a plurality of traveling free jets of liquid into contact with each other, one of said jets comprising a mineral oil product, and another of said jets comprising a chemical adapted to react with such mineral oil product, said jets meeting each other at an angle and flowing, at the time of meeting, at a speed sufficient to disintegrate each other.

2. In the chemical treatment of mineral oil products, the step of directing a plurality of traveling free jets of liquid into contact with each other, one of said jets comprising a mineral oil product, and another of said jets comprising sulfuric acid, said jets flowing, at the time of meeting, at a speed sufficient to disintegrate each other.

3. In the chemical treatment of mineral oil products, the step of directing a plurality of unconfined traveling jets of liquid into contact with each other, one of said jets comprising a mineral oil product, and another of said jets comprising a mixture including sulfuric acid as a constituent thereof, said jets flowing, at the time of meeting, at a speed sufficient to disintegrate each other.

4. The herein described process which comprises directing a plurality of free jets of liquid into contact with each other at a speed sufficient to disintegrate each other, one of said jets comprising a mineral oil product to be purified, and another of said jets comprising a chemical adapted to serve in the purification thereof, the axes of said jets not all lying in exactly the same plane such jets meeting each other at an angle.

5. The process which comprises forcibly squirting a plurality of free streams of hydrocarbon oil against each other such streams flowing at a speed sufficient to disintegrate each other, and introducing purifying acid into the oil, at near the point where the said streams meet each other at an angle.

6. The process which comprises forcibly squirting a plurality of free streams of hydrocarbon oil at an angle against each other, the axes of said streams not lying in the same plane, and introducing purifying acid into the oils, at near the point of meeting of the said streams, said streams meeting with sufficient force to disintegrate each other to produce a mist.

7. The process which comprises squirting rapidly flowing solid free streams of hydrocarbon oil material against each other at about right angles to each other, and squirting a jet of acid at the meeting place, said streams meeting with sufficient force to disintegrate each other to produce a mist.

8. The process which comprises squirting rapidly flowing solid free streams of mineral oil material against each other at about right angles to each other, the axes of said streams not lying in the same plane, said streams meeting with sufficient force to disintegrate each other to produce a mist, and squirting a jet of acid at the meeting place.

9. The process which comprises causing free streams containing mineral oil material to meet off-center, and with great force, and supplying a purifying chemical to the old material at the meeting place.

10. A process which comprises squirting a free stream of hydrocarbon oil with great force against another forcible free stream of material containing acid sludge, said streams meeting at an angle between 60° and 120° into a receptacle, and allowing the mass to settle.

11. A process which comprises squirting a free stream of hydrocarbon oil with great force against another forcible free stream of material containing acid sludge, into a receptacle, said streams meeting at about a right angle and allowing the mass to settle, treating the oil from such settling operation with acid, and again allowing to settle.

12. A process which comprises squirting a free stream of hydrocarbon oil, with great force against another forcible free stream of material containing acid sludge such streams meeting at an angle between 60° and 120°, and projecting the resulting mixed material against a baffle and allowing the mass to settle, treating the oil from such settling operation with acid, and again allowing to settle, and treating the acid sludge of such second settling with more oil in the first mentioned operation.

13. A process which comprises directing a high-velocity free stream of hydrocarbon oil at an angle of more than 60° against a free stream of acid sludge, said streams being caused to meet in slightly decentered relation, allowing the product to collect and settle; directing a high-velocity free stream of the hydrocarbon oil so treated at an angle of more than 60° against a second free stream similar thereto, said streams being in slightly decentered relation, and directing a stream of sulfuric acid at the meeting place of last mentioned two streams, allowing the product to collect and settle; drawing off the so treated oil from the sludge, for further purification, drawing off the sludge for employment in the first operation, each of said steps being substantially continuous.

14. A process which comprises directing at each other free forcible jets of mineral oil material and a purifying chemical under such conditions as to meet at an angle between 60° and 120°, to produce an intimate mixture and projecting such mixture forcibly against a baffle, whereby a complete mixing of said oil material and purifying chemical is effected.

15. In the chemical treatment of mineral oil products, the step of directing a plurality of traveling free jets of liquid into contact with each other, one of said jets comprising a mineral oil product, and another of said jets comprising a chemical adapted to react with such mineral oil product, said jets flowing, at the time of meeting, at a speed sufficient to disintegrate each other with the production of a mist and such jets meeting each other at an angle of between 60° and 120°.

16. A process which comprises squirting at each other, free jets of mineral oil material, at an angle of between 60° and 120° and bringing a chemical purifying agent into the oil material at near the point of meeting of said streams.

17. A process which comprises squirting at each other, free jets of mineral oil material, at an angle of between 60° and 120° and bringing a chemical purifying agent into the oil material at near the point of meeting of said streams, and projecting the mixture forcibly against a baffle.

18. A process which comprises atomizing mineral oil products and purifying chemical, and forcibly projecting such atomized material against a baffle, and thereafter settling the resulting product.

19. A process which comprises squirting at each other, at an angle between about 60° and about 120°, free unsubmerged streams of mineral oil material, such streams meeting each other with sufficient force to produce a substantially atomized product, while supplying a purifying chemical to the oil.

20. A process which comprises squirting at each other, at an angle between about 60° and about 120°, free unsubmerged streams of mineral oil material, such streams meeting each other in a slightly decentered relation and with sufficient force to produce a substantially atomized product, while supplying a purifying chemical to the oil.

21. A process which comprises projecting at each other, free streams of mineral oil material, with sufficient force to disintegrate each other, such streams meeting at an angle between the approximate limits of 60° to 120°, and lying in closely adjacent, but not coincident planes, whereby the oil material is atomized, and supplying a purifying chemical to the oil at near the point of meeting of such streams.

In testimony whereof I affix my signature.

ARTHUR B. FOSTER.